United States Patent [19]

Vannier et al.

[11] Patent Number: 4,862,090
[45] Date of Patent: Aug. 29, 1989

[54] MEASURING PAD ARRANGEMENT FOR A LOGGING SONDE

[75] Inventors: Daniel Vannier, St Cyr l'Ecole; Jacques Tromelin, Longjumeau, both of France

[73] Assignee: Schlumberger Technology Corporation, New York, N.Y.

[21] Appl. No.: 164,253

[22] Filed: Mar. 4, 1988

[30] Foreign Application Priority Data

Mar. 5, 1987 [FR] France .................. 87 02973

[51] Int. Cl.[4] ................ G01V 3/02; G01V 3/20
[52] U.S. Cl. .................. 324/367; 324/347; 250/268
[58] Field of Search ........... 324/366, 367, 374, 347, 324/355; 33/178 F, 304, 302; 166/250, 254, 64, 113; 250/268; 181/102, 104; 367/911; 73/151

[56] References Cited

U.S. PATENT DOCUMENTS

| | | | |
|---|---|---|---|
| 2,930,969 | 3/1960 | Baker | 324/347 |
| 3,379,964 | 4/1968 | Segesman | 324/374 |
| 3,379,965 | 4/1968 | Tanguy et al. | 324/374 |
| 3,818,324 | 6/1974 | Espinasse | 324/347 X |
| 4,468,623 | 8/1984 | Gianzero et al. | 324/367 |
| 4,588,951 | 5/1986 | Ohmer | 324/374 X |
| 4,614,250 | 9/1986 | Panetta et al. | 181/102 |
| 4,692,908 | 9/1987 | Ekstrom et al. | 324/355 X |

FOREIGN PATENT DOCUMENTS 2154320  9/1985  United Kingdom .

OTHER PUBLICATIONS

Ekstrom et al., "Formation Imaging with Microelectrical Scanning Arrays", The Log Analyst, vol. 28, No. 3, pp. 294–306, May–Jun. 1987.

Primary Examiner—Reinhard J. Eisenzopf
Assistant Examiner—Warren S. Edmonds
Attorney, Agent, or Firm—Clifford L. Tager; Keith G. W. Smith

[57] ABSTRACT

In order to increase the angular field of observation of a logging sonde usable, in particular for dip metering, the sonde is equipped with measuring pads each comprising two independent flaps. The flaps of the same pad are hinged to a central element which is held permanently parallel to the axis of the sonde body, and they are applied against the wall of a borehole by blade springs. Each of the flaps carries an array of electrodes. The flaps of each of the measuring pads are circumferentially offset relative to each other so that the angular field of observation is increased without increasing the diameter of the sonde, once the pads have been retracted.

15 Claims, 6 Drawing Sheets

MEASURING PAD ARRANGEMENT FOR A LOGGING SONDE

BACKGROUND OF THE INVENTION

The invention relates to a logging sonde for investigating the geological formations traversed by a borehole.

In order to compare the resistivity at various points on the wall of a borehole, in particular for dip metering, a sonde equipped with measuring pads fitted on their outer faces with electrodes or transducers for being applied against the wall is lowered into the borehole. The sonde is suspended from a cable which also serves to transmit electrical signals between the sonde and surface equipment.

Measurement per se is normally performed while the sonde is progressively raised up the borehole. The pads are then applied against the walls of the borehole by resilient means such as blade springs.

A sonde operating in accordance with this principle is described in U.S. Pat. No. 4,614,250. This sonde includes four measuring pads which are regularly distributed around the body of the sonde with each pad being rigid and made in one piece.

A logging sonde of this type has also been described in the article entitled "Formation Imaging with Microelectrical Scanning Arrays" by M. P. Ekstrom et al, published in The Log Analyst (Vol. 28, No. 3, May--June 1987). The latter sonde includes two adjacent measuring pads 90 degrees apart, for providing an image of the stratigraphic characteristics of the geological formations through which they pass. To this end, each of these two pads is equipped with a distributed array of electrodes such that by vertically displacing the sonde in the borehole it is possible to obtain a complete image over the width of the electrode array. Events of substantially the same size as the electrodes are thus detected in the zone scanned by each pad.

For the sake of economy, logging sondes are generally designed so as to be capable of being used in all existing boreholes, whose diameters vary in practice between 15.2 cm (6 inches) and 50.8 cm (20 inches). The diameter of such sondes after the pads have been retracted along the sonde body must therefore be slightly less than the minimum diameter of a borehole. In practice, the maximum acceptable diameter for a sonde with retracted pads is about 12.7 cm (5 inches).

Because of this size constraint, the angular field of observation of the sonde described in the above mentioned article of M. P. Ekstrom et al is relatively narrow even in a small diameter borehole. The two pads provide two disjoint images in two perpendicular directions with the widths of the images being limited to the widths of the arrays. In practice, the field of observation of this sonde is about 22% in a borehole having a diameter of about 20.3 cm (8 inches). Under these conditions, it can happen that information of major importance for borehole exploitation, e.g. singularities having a vertical or sub-vertical nature in the stratigraphic characteristics of the geological formation passed through, are not detected.

In order to remedy this drawback, it is possible to perform several successive passes along the same borehole with the sonde being angularly offset about its axis from one pass to another.

However, it is rarely possible to obtain the desired result by this operation since boreholes usually have an elliptical section which tends to orient the sonde in a privileged direction which remains the same from one pass to another. Further, the need to run several successive passes of the sonde along the same borehole penelizes the operator since there is a corresponding increase in the time for which the drilling rig is out of service.

An obvious improvement in results would be obtained by equipping a logging sonde with four pads each fitted with an array of electrodes. However, the angular field of observation would remain less than 50% in a borehole having a diameter of about 20.3 cm (8 inches), and this is not enough.

SUMMARY OF THE INVENTION

The aim of the invention is thus to provide a logging sonde equipped with pads of a new type enabling an omnidirectional image of the stratigraphic characteristics of the geological formations traversed by a borehole to be obtained over an angular field of observation which is considerably increased relative to existing sondes, and without increasing the maximum diameter of the sonde after the pads have been retracted along the sonde body.

To this end the present invention provides a logging sonde comprising an elongate sonde body, measuring pads distributed around the sonde body, hinged arms connecting the pads to the sonde body and maintaining the pads parallel to the longitudinal direction of the body, and resilient means applying a force to the pads tending to move them away from the sonde body. According to the invention, the sonde is characterized in that each measuring pad is constituted by a central element having two side measuring flaps hinged thereto parallel to the longitudinal direction, said flaps being disposed on either side of the central element and being staggered relative to each other along said longitudinal direction in such a manner as to form two series of adjacent flaps, the flaps of one of the series being offset circumferentially relative to the flaps of the other series.

The angular field of observation of a sonde made in this way is 100% in a borehole whose diameter is less than or equal to about 17.8 cm (7 inches) and is 88% in a borehole whose diameter is about 20.3 cm (8 inches), and there is no need to perform several passes.

In a preferred embodiment of the invention, each of the flaps carries an array of electrodes on its outside face, the arrays of the two flaps of each pad defining two overlapping observation zones which are angularly offset circumferentially relative to each other. An array of electrodes may also be provided on the central element.

Preferably, the resilient means comprise blade springs, with a first end of each spring being fixed to the sonde body and with the opposite end of each spring being connected to the two flaps of one of the pads via hinged links. Proper application of each flap against the wall of the borehole is thus ensured during measurement.

In order to enable the flaps to be completely folded when the sonde is inserted into the borehole, the sonde may also include means for automatically controlling the folding of the flaps against the sonde body when the distance between the pads and the sonde body is less than a given value, equal, for example, to about 2.5 cm (1 inch).

In the preferred embodiment of the invention, the central element of each pad is mounted at the ends of two parallel hinged arms of the same length which are supported on the sonde body in such a manner as to pivot about two mutually parallel axes which are orthogonal to the axis of the sonde body, with the pad retracting control means acting on one of these two hinged arms.

BRIEF DESCRIPTION OF THE DRAWINGS

Two embodiments of the invention are described by way of non-limiting example and with reference to the accompanying drawings, in which.

DETAILED DESCRIPTION OF THE PREFERRED EMBODIMENTS

Figure 1:
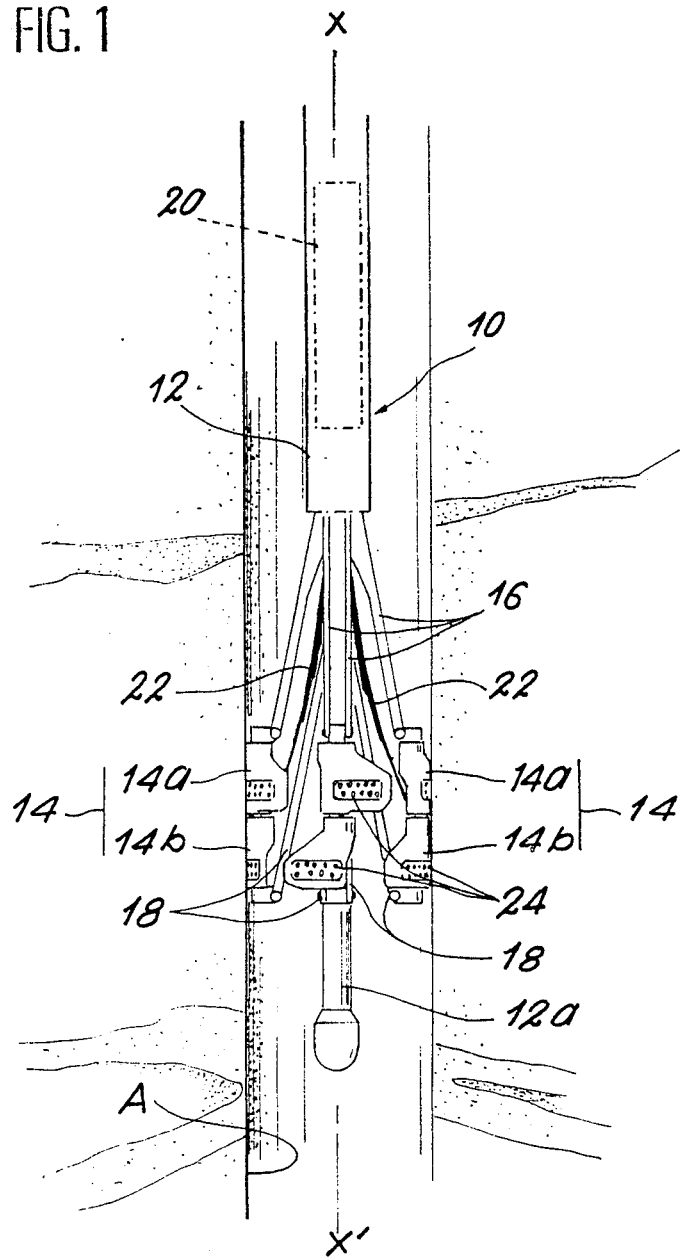
FIG. 1 is a diagrammatic vertical section view through a portion of a borehole having a logging sonde in accordance with the invention inserted therein.

FIG. 1 is a diagrammatic view of a portion of a borehole A such as an oil well traversing geological formations for which it is desired to obtain an image using as wide an angular field of observation as possible. The borehole A may be vertical, as shown in FIG. 1, or it may slope to a greater or lesser extent relative to the vertical.

A dip metering device has been inserted into borehole A and FIG. 1A shows only the bottom end thereof. In conventional manner, this device is suspended from a cable (not shown) connected to surface equipment (not shown), with the cable also serving to transmit electrical signals between the surface equipment and the device.

The dip metering device is in the form of an elongate body of generally circular section whose approximately constant diameter does not exceed about 12.7 cm (5 inches) at its largest portion. This characteristic makes it possible to insert the device into any existing borehole, since existing borehole diameters lie between about 15.2 cm (6 inches) to about 50.8 cm (20 inches).

The measuring device comprises a plurality of superposed stages. Starting from the top, these stages generally include a telemetry stage providing an interface between the cable and an electronic stage, an inclinometer stage (for determining the inclination and the azimuth of the device relative to a ground reference by means of accelerometers and magnetometers), the above-mentioned electronic stage (for producing control and excitation signals in communication with the surface equipment and for processing measurement signals), and a dip metering sonde.

The invention relates solely to the sonde which is why only this sonde is shown in FIG. 1 where it is designated overall by reference 10.

The sonde 10 comprises a sonde body 12 having a longitudinal axis XX' and constituting the bottom portion of the elongate body of the measuring device. In the embodiment of FIGS. 1 to 5, the sonde body 12 carries four measuring pads 14 which are situated at the same level and which are regularly spaced around the axis XX'.

The pads 14 are connected to the sonde body 12 in such a manner as to be capable of being retracted against a smaller diameter bottom portion 12a of said body or of being applied against the walls of the borehole A. By retracting the pads, the sonde can satisfy the maximum diameter constraints for enabling the device to be inserted into a borehole of any diameter. In contrast, the measuring pads must be applied against the walls of the borehole in order to obtain satisfactory measurements.

In accordance with the invention, each of the pads 14 comprises two independent measuring flaps constituting a top flap 14a and a bottom flap 14b. The two flaps 14a and 14b of the same pad are hinged to a central element constituted in the embodiment shown in FIGS. 2, 3a and 3b by a common shaft 26.

Each of the shafts 26 carrying the pads 14 is connected to the sonde body 12 by two mutually parallel hinged arms constituting a top arm 16 and a bottom arm 18. The arms 16 and 18 carrying the shafts 26 are placed in two mutually perpendicular planes passing through the axis XX' of the sonde body and they are disposed symmetrically about said axis. The sonde body 12 together with the shafts 26 and the hinged arms 16 and 18 thus constitute four deformable parallelograms enabling the shafts 26 to be permanently maintained parallel to the axis XX' of the sonde body, regardless of the distance between the pads and the sonde body.

The pads are retracted against the small diameter bottom portion 12a of the sonde body by a hydraulic control system 20 which is housed in the top portion of the body 12. The system 20 acts on the top ends of the hinged arms 16 in a manner described in greater detail below.

At this stage of the description it is merely noted that the action of the system 20 on the top arms 16 is such that these arms are coupled in diametrically opposite pairs so that opposite arms 16 are always symmetrically extended relative to the sonde body. In contrast, the arms of one of the pairs are extended independently from the arms in the other. This disposition makes it possible for the pads to remain in contact with the walls of the borehole while ensuring that the sonde body is centered relative to the borehole, even when the borehole is oval in section.

The hydraulic system 20 may be made in the manner described in U.S. Pat. No. 4,614,250. Reference should therefore be made to the description in said document for further details.

It should be observed that the hydraulic system 20 is not essential for the invention. A simplified sonde could be designed in which the pads are held in the retracted position by a latch type system, with the system being remotely unlatched when the sonde is in place in the borehole.

The pads 14 are applied against the surface of the wall A of the borehole by blade springs 22 interposed between the sonde body 12 and the flaps 14a and 14b constituting each of the measuring pads. The top ends of the springs 22 are fixed directly to the sonde body 12. The connections between the bottom ends of these springs and the various pairs of flaps are described in detail below. The springs 22 are situated in the same planes as the arms 16 and 18.

The use of spring blades 22 makes it possible to apply the pads 18 against the wall of the borehole with a resilient force which is substantially constant regardless of the distance between the pads and the sonde body. Since diametrically opposite pads 14 are symmetrically disposed about the axis XX' of the sonde body, the pads 14 are applied against the wall of the borehole with a resilient force which is practically uniform from one pad to another.

On the outer face of each of the measuring flaps 14a and 14b there is an array of electrodes or transducers 24 disposed in such a manner as to provide an image of the zone of the borehole wall which is scanned by said array when the flaps move at constant speed along the borehole. Electrodes of any shape and arrays of any configuration may be chosen, providing this result is obtained.

Thus, and purely by way of example, the electrodes 24 may be circular and disposed in a plurality of superposed rows, with the electrodes of successive rows being mutually staggered angularly about the axis XX' of the sonde.

When they are in contact with the wall of the borehole, the electrodes serve to measure the resistivity of the geological formation in front of the flap 14a or 14b on which the electrodes are mounted.

The electrical connections feeding the electrode 24 from the electronic stage of the dip metering device, and the electrical connections by which the signal is delivered by the electrodes are transmitted to said electronic stage are provided in known manner by cabling connecting each of the pads to the sonde body, said cabling entering into the pads and into the body via sealed feedthroughs.

Figure 2:
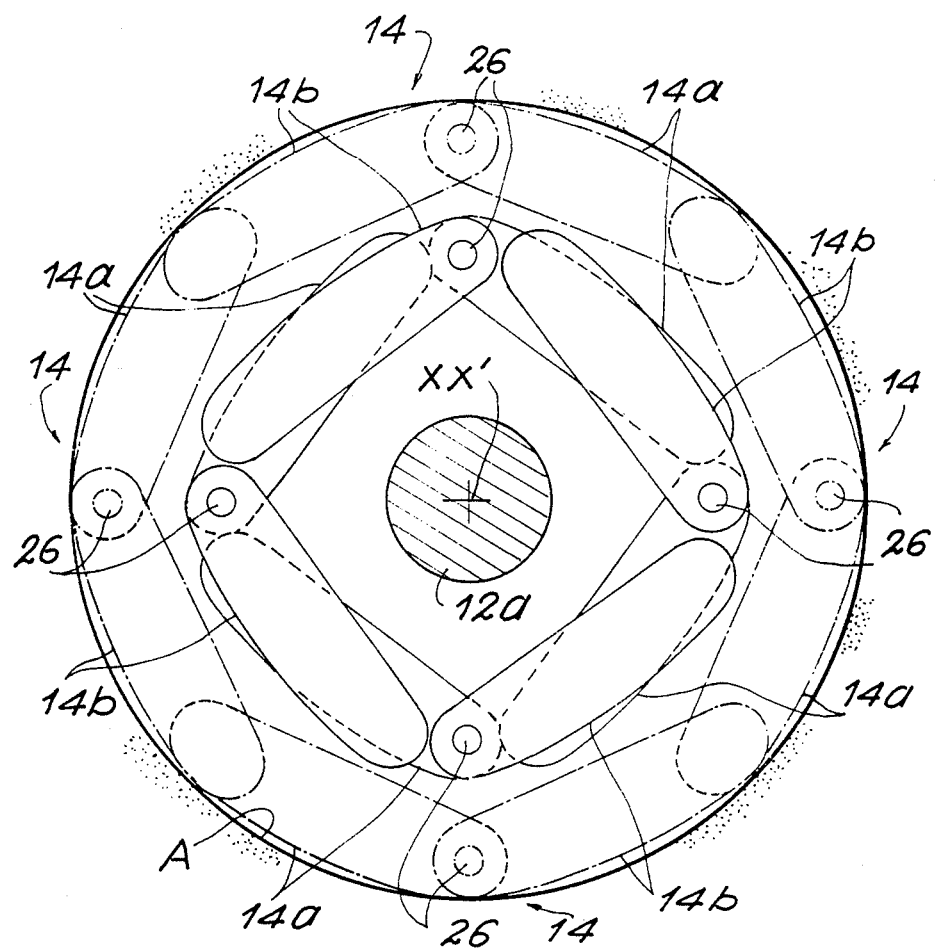
FIG. 2 is a diagrammatic end view of the sonde with solid lines showing its pads in the retracted position, and with dot-dashed lines showing its pads as deployed in a borehole having a diameter of about 17.8 cm (7 inches)
Figure 3A:
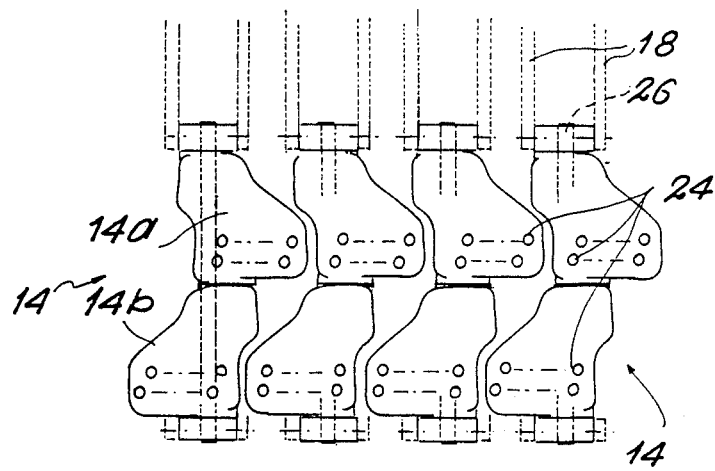
FIGS. 3a and 3b are two developed views respectively showing the pads of the sonde in the retracted position and when deployed in a borehole having a diameter of about 17.8 cm (7 inches)
Figure 3B:
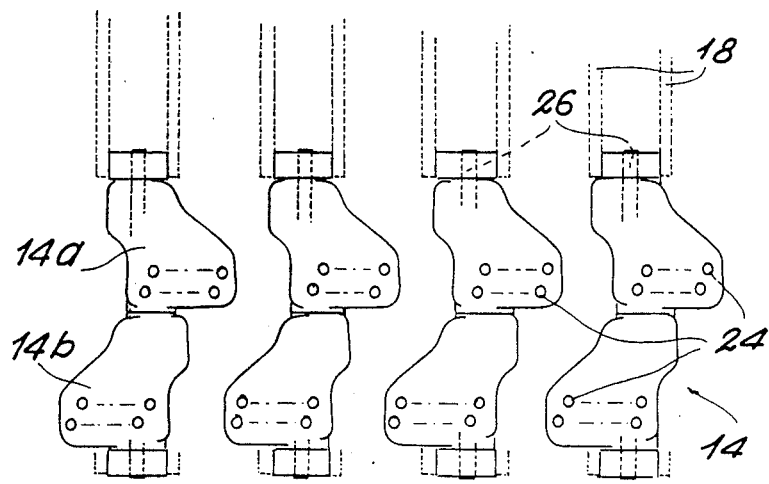

The pads 14 are now described in greater detail with references to FIGS. 2, 3a and 3b.

The outer face of each measuring flap 14a and 14b carries the electrodes 24 occupying a circular arc in a section on a plane perpendicular to the axis XX' of the sonde, with the radius of said arc being chosen so as to ensure that the face can be properly applied against the wall of a borehole regardless of its diameter. In practice, this radius is generally equal to the average value of the radiuses of the boreholes in which the sonde can be used.

As shown clearly in FIGS. 2, 3a and 3b (see in particular the deployed position as shown in dot-dashed lines in FIG. 2), the two flaps 14a and 14b of each measuring pad extend on opposite sides of their common hinge shaft 26. More precisely, all of the top flaps 14a extend in the same circumferential direction (for example in the counter-clockwise direction when the sonde is seen from below) while all of the bottom flaps extend in the opposite circumferential (for example in the clockwise direction when seen from below).

Further, all of the flaps 14a and 14b have the same circumferential length. This length is chosen to be as large as possible so as to obtain a maximum amount of circumferential scanning by the electrodes carried by each flap.

The circumferential length of each flap is nevertheless limited by the need to be able to fold the flaps down inside a circle which does not exceed the maximum authorized diameter (generally about 12.7 cm). In this position, as shown in solid lines in FIG. 2, the free end of each top flap 14a becomes flush with the end of the adjacent top flap where it is mounted on the shaft 26. Similarly, the free end of each bottom flap 14b then becomes flush with the end of the adjacent bottom flap where mounted on a shaft 26.

This arrangement is made possible by the fact that the top flaps 14a are offset parallel to the axis XX' of the sonde body relative to the bottom flaps 14b. More precisely, since the heights of the flaps 14a and 14b are the same, each of the flaps 14a is mounted on the top half of the corresponding pivot shaft 26 while the bottom flap 14b of the same pad is mounted on the bottom half of said shaft.

The arrays of electrodes 24 on the flaps 14a and 14b of the same measuring pad thus define two angular observation zones which are circumferentially staggered relative to each other without any discontinuity therebetween.

By virtue of the above-described configuration, each of the mesuring pads 14 provides an angular observation zone which is substantially twice that of a one-piece fixed pad as currently used, but without increasing the radial extent of the configuration after the pads have been retracted. As shown in FIG. 3b and in dot-dashed lines in FIG. 2, when the pads are deployed, the flaps 14a and 14b constituting them form two series of flaps which are staggered relative to each other about the axis XX' with the flap in each series being angularly offset about said axis relative to the flaps in the other series. In contrast, when the pads are retracted (FIG. 3a and solid lines in FIG. 2), the top flap 14a and the bottom flap 14b of an adjacent measuring pad 14 occupy practically the same angular sector about the axis XX'.

Thus, the angular field of observation of a logging sonde in accordance with the invention is 100% when the diameter of the borehole is about 17.8 cm (7 inches), as shown in FIG. 3b and in dot-dashed lines in FIG. 2. Measurement overlap is even obtained for boreholes of smaller diameter, with said overlap reaching 42% when the sonde is in its closed position. Further, the angular field of observation remains very high even for boreholes of larger diameter. For example, it is 88% for a borehole having a diameter of about 20.3 cm (8 inches).

Further, the fact that the two flaps 14a and 14b constituting each of the measuring pads of the sonde are freely hinged about the corresponding shaft 26 makes it possible for these pads to adapt automatically to the curvature of the borehole. It is thus certain that proper application of the pads against the borehole wall will be obtained, thereby guaranteeing good quality measurement.

Figure 4:
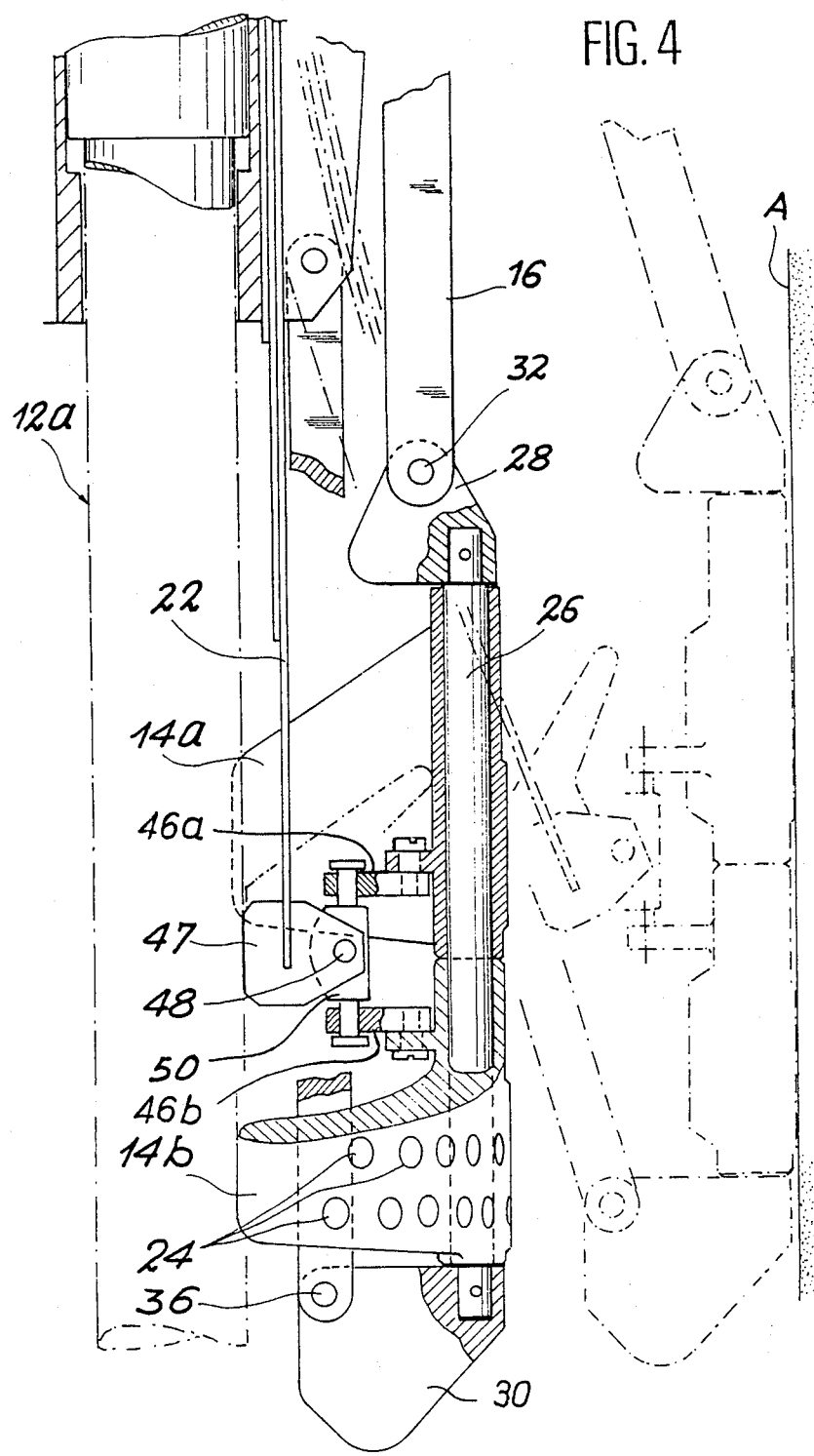
FIG. 4 is a fragmentary section view showing, on a larger scale, the connection between one of the measuring pads and the body of the FIG. 1 sonde, with the various components being shown by solid lines in the retracted position and by dot-dashed lines in the deployed position.
Figure 5:
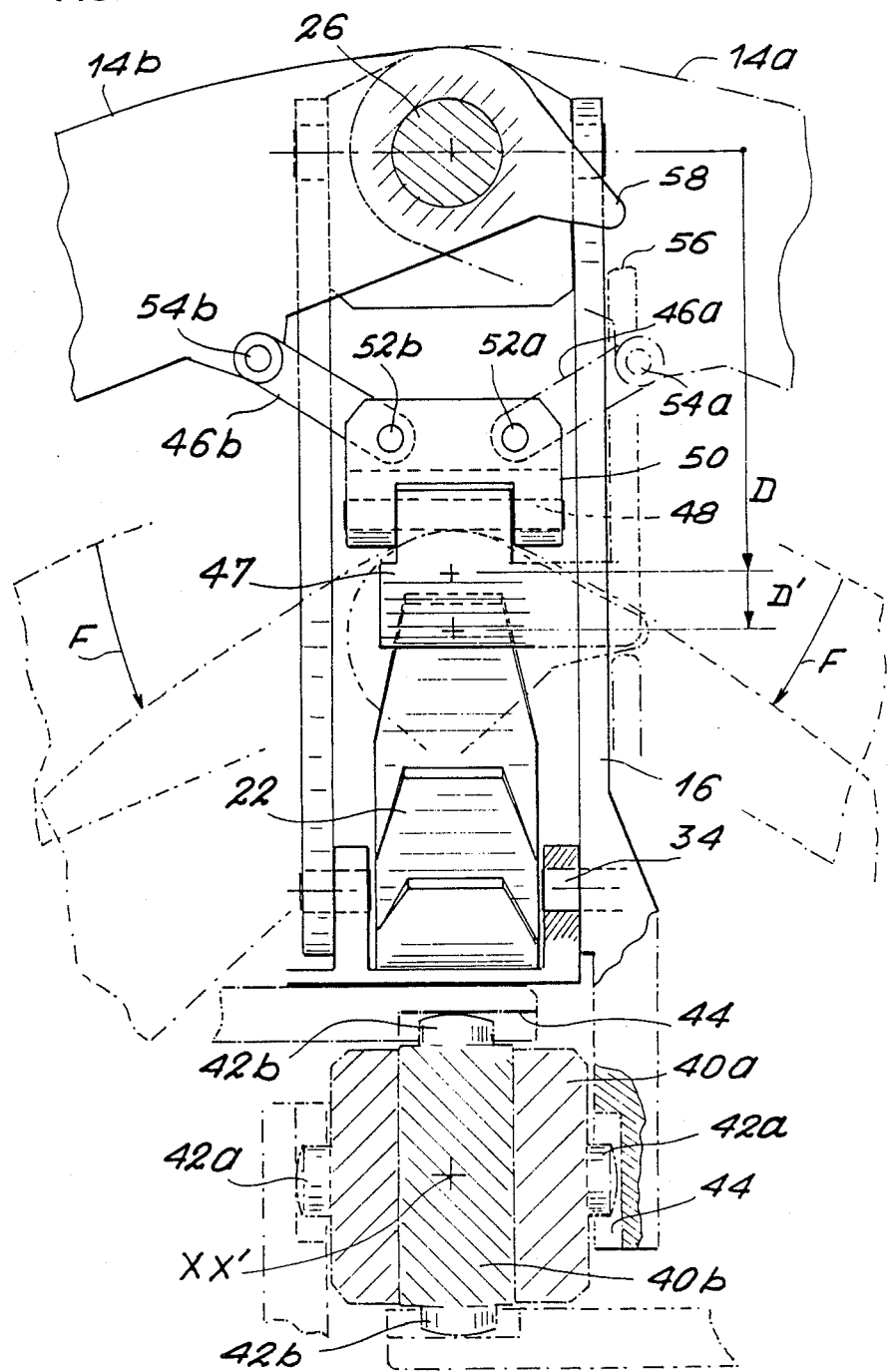
FIG. 5 is an end view in partial section showing one of the pads being retracted against the body of the sonde from its deployed position shown in solid lines to its retracted position shown in dot dashed lines.

A more detailed description of the assembly of the pads 14 of the sonde body 12 is now given with reference to FIGS. 4 and 5.

The ends of each of the pivot shafts 26 are fixed respectively to a top support 28 and to a bottom support 30.

Each of the supports 28 is hinged to the end of the top arm 16 by a shaft 32 extending orthogonally to the axis XX' of the sonde body 12. The opposite end of the top arm 16 is pivotally mounted on the sonde body 12 about a shaft 34 (FIG. 5) running parallel to the hinge axis 32 of said arm.

Similarly, each of the bottom supports 30 is hinged to the end of the corresponding bottom arm 18 about a shaft 36 orthogonal to the axis XX' of the sonde body and parallel to the hinge axis 32 of the corresponding top arm 16. The opposite end of the arm 18 is hinged to the sonde body about a shaft (not shown) extending parallel to the hinge axis 36 of said arm.

The hinge axes of the arms 16 and 18 carrying the same pad 14 are disposed on the sonde body 12 and on the corresponding pivot axis 26 in such a manner that the arms 16 and 18 together with the body 12 and the shaft 26 constitutes a deformable parallelogram. Thus, each of the shafts 26 remains constantly parallel to the axis XX' of the sonde body.

As mentioned above, the pads are folded into their retracted position under the control of the hydraulic system 20 housed in the sonde body. The hydraulic system is actuated to displace two control rods 40a and 40b (FIG. 5) along the axis XX' of the sonde body, said control rods being interleaved and received in the body 12. These rods 40a and 40b control pivoting of each of the diametrically opposite pairs of top arms 16 about their axes 34 in independent manner.

One possible example of co-operation between the rods 40a and 40b and each of the opposite pairs of arms 16 is described in detail in document U.S. Pat. No. 4,614,250. This portion of the sonde is conventional and does not form part of the invention. It is therefore not described in detail.

It is simply recalled that in the embodiment described in the above-mentioned document, each of the rods 40a and 40b has two diametrically opposite studs designated in FIG. 5 by references 42a and 42b, respectively. These studs 42a and 42b extend radially from the axis XX; of the sonde body and penetrate into grooves 44 disposed perpendicularly to said axis XX' and formed in each of the top arms 16. More precisely, each of the arms 16 is U-shaped in section and each of the slots is formed on the inside face of an extension of one of the arms of the U extending beyond the hinge axis 34.

By virtue of the above-described arrangement, it will be understood that moving ech of the rods 40a and 40b parallel to the axis XX' has the effect of pivoting the corresponding pair of arms 16 about the axes 34.

As mentioned above, the pads are applied against the wall by blade springs 22 each having one end fixed to the sonde body 12. As can be seen in FIGS. 4 and 5, in particular, each of the blade springs 22 acts independently on the two flaps 14a and 14b of the corresponding measuring pad via two links 46a and 46b.

More precisely, the free ends of the blade spring 22 has an end fitting 47 hinged to an intermediate part 50 about a pin 48 extending orthogonally to the sonde body axis XX'. A first end of each of the links 46a and 46b is pivotally mounted to said part 50 about pins 52a and 52b which extend parallel to the sonde body axis XX'. The opposite ends of the links 46a and 46b are connected to respective ones of the flaps 14a and 14b by pins 54a and 54b which likewise extend parallel to the axis XX'.

Thus, each of the blade springs 22 applies a resilient force independently to each of the flaps 14a and 14b constituting the corresponding measurement pad, said force tending to move the flaps away from the sonde body and to apply them against the wall of the borehole.

When the hydraulic system 20 controls retracting of the flaps against the small diameter portion of the sonde body against said resilient force, the flaps 14a and 14b of each of the measuring pads remain normally deployed under the pivoting effect applied to these flaps about the shaft 26 by the action of the blade spring 22. In order to retract the flaps completely, it is therefore desirable to provide special folding means which are now described.

In the embodiment shown in FIGS. 4 and 5, these folding means comprise, for each measuring pad 14, a folding control peg 56. The peg 56 is fixed to the end fitting 47 at the free end of the corresponding blade spring 22.

When the padds are retracted, each of the pegs 56 bears against a finger 58 formed on one of the flaps 14a and 14b of the corresponding pad (the flap 14b in FIG. 5). This finger 58 projects from the circumferential end of the flap situated on the same side as the hinge shaft 26 relative to the pin 54b via which the link 46b acts on the flap. Under the effect of the pegs 56 coming into contact with the fingers 58 while the pads are being retracted, the flaps 14b pivot about the shafts 26 so as to fold back against the portion 12a of the sonde body. A similar movement of the flaps 14a is obtained by virtue of these flaps being connected to the flap 14b via the links 46a and 46b and the intermediate part 50.

The distance between the pad pivot shafts 26 and the sonde body axis XX' at which the pegs 56 come into contact with the fingers 58 is designed so that the flaps are fully folded when the distance between the shafts 26 and the axis XX' is at a minimum.

As shown in FIG. 5, two stages therefore need to be taken into consideration when retracting the pads.

In a first stage during which the pegs 56 remain at a distance from the fingers 58, the distance between the shafts 26 and the axis XX' of the sonde body reduces without the flaps 14a and 14b pivoting about the shafts 26. The flaps are then held away from the sonde body by the blade springs 22. This stage corresponds to the displacement D shown in FIG. 5.

In a second, pad-retracting stage, the shafts 26 continue to move closer to the sonde body under the action of the hydraulic control system 20 and as illustrated at D' in FIG. 5. However, the pegs 56 now press against the fingers 58 so that teh flaps 14a and 14b pivot about their shafts 26 in order to fold back against the portion 12a of the sonde body as described above. This pivoting is shown diagrammatically by arrows F in FIG. 5.

In practice, the displacement D' corresponds to about 2.5 cm (1 inch) for example. In other words, if the diameter of the sonde after the pads have been retracted is about 12.7 cm (5 inches), then the second stage of pad retracting begins when the pads lie within a diameter of about 17.8 cm (7 inches).

The above description with reference to FIGS. 1 to 5 relates to an embodiment in which the sonde has four measuring pads 14 each comprising two flaps 14a and 14b hinged on a common shaft 26. This embodiment should not, however, be considered as being limiting, in particular with respect to the number of pads 14 and with respect to the design of the intermediate part supporting the two flaps of each pad.

Figure 6A:
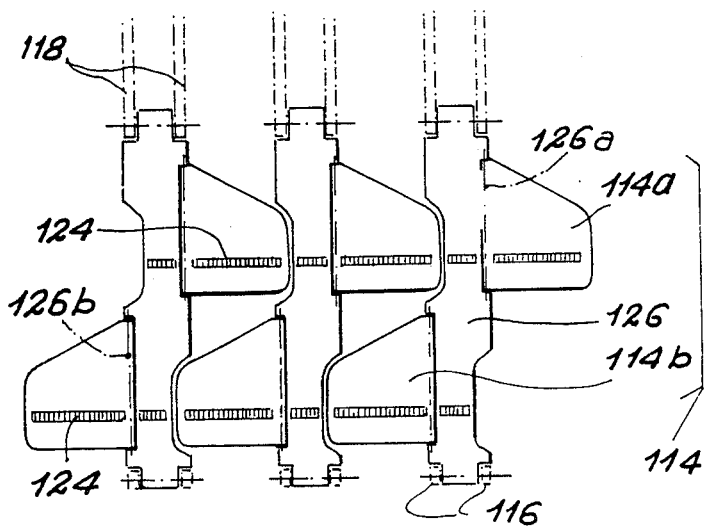
FIGS. 6a and 6b are developed views similar to FIGS. 3a and 3b showing a second embodiment of a sonde in accordance with the invention.
Figure 6B:
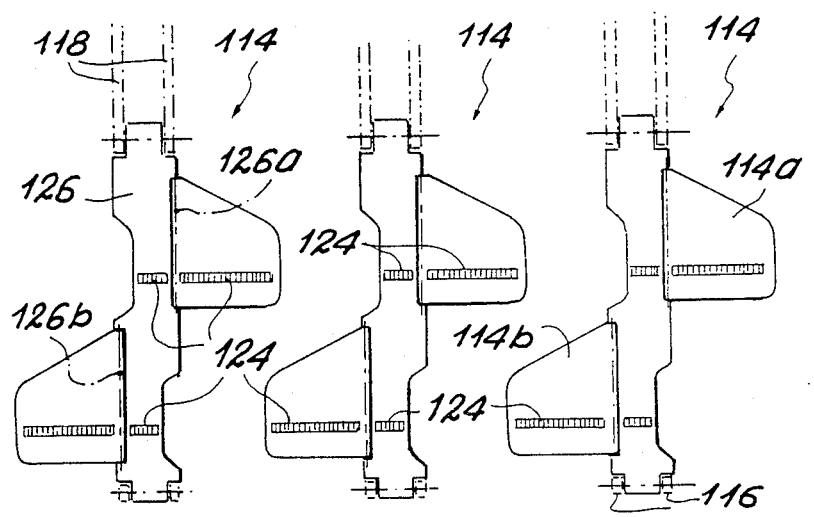

This is illustrated by FIGS. 6a and 6b which are developed views showing another embodiment of a sonde in accordance with the invention, in which the pads are shown respectively in the retracted position and in the deployed position. For the purposes of simplification, items similar to those of the embodiment shown in FIGS. 1 to 5 are designated by the same numerical references plus 100.

In FIGS. 6a and 6b, it can be seen that the sonde has only three measuring pads 114. In accordance with the invention, each of these pads 114 comprises two measuring flaps 114a and 114b, together with a central element 126.

The flaps 114a and 114b have a relative disposition and configuration similar to that of the flaps 14a and 14b of the embodiment shown in FIGS. 1 to 5. The same is true of the array of electrodes 124 carried by each flap.

In contrast, the central element is not constituted in this case by a common shaft on which the flaps are hinged, but rather by a part 126 which extends over a certain circumferential width. Consequently, the flaps 114a and 114b are hinged to this part 126 about two parallel shafts or hinges, shown diagrammatically at 126a and 126b. As for the shaft 26 in the above embodiment, the hinges 126a and 126b are held constantly parallel to the longitudinal axis of the sonde body by the arms which support the pads.

FIGS. 6a and 6b show that in this embodiment the circumferential width of the parts 126 makes it possible to place on the outside faces thereof two sets of electrodes 124 which are identical to the electrodes carried by the flaps 114a and 114b and which are disposed in line with said electrode.

The parts 126 are hinged to the arms 116 and 118 in the same way as in the above-described embodiment. However, the ends of the blade springs (not shown) for deploying the pads 114 may be fixed directly to the parts 126. The flaps 114a and 114b may be deployed under the control, for example, of torsion springs mounted on the hinges 126a and 126b.

In order to enable the flaps to be automatically folded against the sonde body when the distance between the parts 126 and the sound body becomes less than a given value, use may be made of fixed pegs carried by the sonde body and coming into abutment against tongues extending the flaps 114a and 114b beyond their hinges 126a and 126b.

A comparison between FIGS. 6a and 6b shows that this second embodiment provides the same advantages as the above embodiment.

More precisely, it can be seen in FIG. 6a that the space occupied by the sonde in a retracted position remains unchanged relative to existing sondes. However, as shown in FIG. 6b, the deployed sonde nevertheless enables a panoramic image to be obtained over a very large angular field of observation which may be 100% for a borehole having a diameter of not more than about 17.8 cm (7 inches).

The above description clearly shows that a measuring sonde in accordance with the invention enables a much larger angular field of observation of the wall of a borehole to be obtained in a single pass than can be obtained with existing sondes. In addition, the two sets of measuring flaps constituted by the top flaps 14a and the bottom flaps 14b are immediately adjacent so that there is nothing to fear from rotation of the sonde about its axis between the passes of the electrodes associated with each of these two series of flaps.

Naturally, the invention is not limited to the embodiments described above by way of example, but extends to any variant thereof.

Thus, the blade springs applying the pads against the walls of the borehole could be constituted by resilient means of a different type.

If blade springs are used, it has been shown that the connection between these springs and the pads may be provided in various different ways. A further way (not shown) has parts analogous to the parts 50 shown in FIGS. 4 and 5 including two cylindrical rods parallel to the sonde body axis and received in T-shaped grooves formed on the inside faces of the slaps in a circumferential direction.

In a variant, the means for controlling the folding of the flaps against the sonde body at the end of pad retraction may be omitted providing the space occupied by the sonde is acceptable even in the absence of such means.

These means for controlling the folding of the flaps may also be different in structure from the described assembly of pegs 56 and fingers 58. In particular, they could include pegs formed on the end fittings 47 and acting on any point of a portion of a flap situated on the same side of the hinge pins 54a and 54b joining the links to the flaps as the pivot shafts 26. These pegs could also be directly formed on the sonde body.

Finally, in an embodiment not shown, each pad includes two flaps hinged about a common shaft on a central element serving as a mechanical support for the flaps. This central element is hinged to the ends of the arms in the same manner as in the above-described embodiments.

What is claimed is:

1. A logging sonde for use in a borehole traversing an earth formation, said logging sonde comprising:
   an elongated sonde body;
   a plurality of measuring means for measuring a characteristic of the earth formation, each of said measuring means comprising:
   a central element;
   a first measuring flap hingably connected to said central element;
   a second measuring flap hingably connected to said central element; said measuring flaps being disposed on either side of said central element, said first measuring flap staggered relative to said second measuring flap along the longitudinal direction of said sonde body;
   means operatively connected between said sonde body and said first and second measuring flaps for applying a resilient force to each of said measuring flaps, thereby tending to move said flaps away from said sonde body; and
   means connected between said sonde body and each of said measuring means for translocating said measuring means away from and back to said sonde body, 2. The sonde according to claim 1, wherein each of said flaps carries an array of electrodes on the face opposite said sonde body, the arrays of the two flaps of each pad defining two overlapping observation zones which are angularly offset circumferentially relative to each other.

3. The sonde according to claim 1, wherein said central element includes an array of electrodes on the face opposite said sonde body.

4. The sonde according to claim 3, wherein said first and second measuring flaps are hinged about respective hinges disposed on either side of said central element.

5. The sonde according to claim 1, wherein said two first and second measuring flaps are hinged about a common hinge shaft.

6. The sonde according to claim 5, wherein said central element is constituted by said common hinge shaft.

7. The sonde according to claim 1, wherein said resilient means comprises a plurality of spring blades, a first end of each of said spring blades being fixed to said sonde body and the second end of each of said spring blades being connected to said measuring flaps by hinged links.

8. The sonde according to claim 1, said sonde further including means for automatically controlling the retraction of the flaps against said sonde body when the distance between said pads and said sonde body is less than a predetermined value.

9. The sonde according to claim 1, wherein said translocating means comprises:
   a first arm hingably connected between said sonde body and one end of said central element; and
   a second arm hingably connected between said sonde body and the other end of said central element, said first and second arms being substantially the same length and parallel to each other.

10. A logging sonde for use in a borehole, the borehole having an interior circumference of a first predetermined value, said logging sonde comprising:
    an elongated sonde body;
    a plurality of measuring pads, disposed about said sonde body, to measure a property of the borehole while in direct contact therewith, said pads having a retracted position such that their position is closely aligned to said sonde body and an expanded position such that their circumference is extended therefrom, each of said pads operatively overlapping at least a portion of the measured surface of its adjacent pads while expanded to a circumference less than or equal to a second predetermined value, and positioned in close proximity to the measured surface of its adjacent pads while expanded to a circumference greater than the second predetermined value, said second predetermined value being greater than said first predetermined value; and
    expansion means coupled to said sonde body and said measuring pads for extending said pads from its retracted position to an expanded position.

11. The logging sonde of claim 10, said measuring pads being symmetrically disposed about said sonde body.

12. The logging sonde of claim 10, said logging sonde comprising at lest three measuring pads.

13. The logging sonde of claim 10, said logging sonde further comprising retraction means coupled to said sonde body and said measuring pads for retracting said pads from its expanded position to its retracted position.

14. The logging sonde of claim 10, each of said measuring pads including:
    a hinge shaft;
    a first flap hingably attached to said hinge shaft;
    a second flap hingably attached to said hinge shaft and at an obtuse angle relative to said first flap; and
    first and second arrays of electrodes coupled to said first and second flaps, respectively, said arrays being directed towards the borehole.

15. The logging sonde of claim 10, wherein said expansion means extends said measuring pads independently, allowing said logging sonde to be centered, relative to the borehole, dispite any irregularities in the circumference of the borehole.

* * * * *